United States Patent
Saitoh et al.

(10) Patent No.: US 7,254,940 B2
(45) Date of Patent: Aug. 14, 2007

(54) EXHAUST GAS PURIFICATION SYSTEM OF INTERNAL COMBUSTION ENGINE

(75) Inventors: Makoto Saitoh, Okazaki (JP); Shigeto Yahata, Obu (JP); Kazuharu Tochikawa, Kariya (JP)

(73) Assignee: DENSO Corporation, Kariya (JP)

( * ) Notice: Subject to any disclaimer, the term of this patent is extended or adjusted under 35 U.S.C. 154(b) by 61 days.

(21) Appl. No.: 11/070,368

(22) Filed: Mar. 3, 2005

(65) Prior Publication Data
US 2005/0198944 A1 Sep. 15, 2005

(30) Foreign Application Priority Data

| Mar. 12, 2004 | (JP) | ............................ 2004-069981 |
| Dec. 16, 2004 | (JP) | ............................ 2004-363993 |

(51) Int. Cl.
*F01N 3/00* (2006.01)
*F01N 3/02* (2006.01)
(52) U.S. Cl. .............................. 60/295; 60/297; 60/311
(58) Field of Classification Search .................. 60/297, 60/311
See application file for complete search history.

(56) References Cited

U.S. PATENT DOCUMENTS

| 4,211,075 | A | * | 7/1980 | Ludecke et al. ............... 60/285 |
| 4,719,751 | A | * | 1/1988 | Kume et al. .................... 60/285 |
| 4,835,964 | A | * | 6/1989 | Kume et al. .................... 60/285 |
| 4,969,328 | A | * | 11/1990 | Kammel ........................ 60/275 |
| 5,121,601 | A | * | 6/1992 | Kammel ........................ 60/275 |
| 6,802,180 | B2 | * | 10/2004 | Gabe et al. .................... 60/285 |
| 6,829,889 | B2 | | 12/2004 | Sait et al. |
| 6,941,750 | B2 | * | 9/2005 | Boretto et al. ................. 60/297 |
| 6,983,591 | B2 | * | 1/2006 | Kondo et al. .................. 60/295 |
| 7,031,827 | B2 | * | 4/2006 | Trudell et al. ................ 701/114 |
| 2004/0172933 | A1 | | 9/2004 | Saito et al. |
| 2005/0154523 | A1 | * | 7/2005 | Yahata et al. ................ 701/108 |
| 2005/0188686 | A1 | * | 9/2005 | Saito et al. .................... 60/297 |

FOREIGN PATENT DOCUMENTS

JP 7-332065 12/1995

OTHER PUBLICATIONS

U.S. Appl. No. 11/228,292 filed Sep. 19, 2005.
U.S. Appl. No. 11/220,596 filed Sep. 8, 2005.

* cited by examiner

*Primary Examiner*—Thomas Denion
*Assistant Examiner*—Loren Edwards
(74) *Attorney, Agent, or Firm*—Nixon & Vanderhye P.C.

(57) ABSTRACT

An electronic control unit (ECU) of an internal combustion engine calculates a present deposition quantity of exhaust particulate matters based on operating states of the engine such as a differential pressure of a diesel particulate filter (DPF). If the present deposition quantity exceeds a predetermined upper limit value, the ECU performs compulsory regeneration of the DPF to compulsorily combust and reduce the deposited exhaust particulate matters. The ECU determines that spontaneous regeneration occurs if a temperature of exhaust gas in the DPF is equal to or higher than a reference temperature. Thereafter, the ECU completes the compulsory regeneration to eliminate the deposited exhaust particulate matters if the ECU determines that the spontaneous regeneration stops and the deposition quantity becomes equal to or less than a predetermined lower limit value.

9 Claims, 5 Drawing Sheets

EXHAUST GAS PURIFICATION SYSTEM OF INTERNAL COMBUSTION ENGINE

CROSS REFERENCE TO RELATED APPLICATION

This application is based on and incorporates herein by reference Japanese Patent Applications No. 2004-69981 filed on Mar. 12, 2004 and No. 2004-363993 filed on Dec. 16, 2004.

BACKGROUND OF THE INVENTION

1. Field of the Invention

The present invention relates to an exhaust gas purification system of an internal combustion engine having a particulate filter. Specifically, the present invention relates to a technology for regenerating the particulate filter at appropriate timing.

2. Description of Related Art

In recent years, improvement of exhaust emission of internal combustion engines mounted to automobiles has been required. Specifically, in a compression ignition diesel engine, of which fuel is light oil, exhaust particulate matters contained in exhaust gas, such as soot or soluble organic fractions, should be reduced in addition to gasses of carbon monoxide, hydrocarbon, and nitrogen oxides. Therefore, a particulate filter is disposed in an exhaust passage for collecting the exhaust particulate matters contained in the exhaust gas.

If the exhaust gas enters the particulate filter, the exhaust gas passes through porous partition walls in the particulate filter. At that time, the exhaust particulate matters contained in the exhaust gas are collected at surfaces or pores of the partition walls. If a quantity of the collected and deposited particulate matters (a deposition quantity) increases excessively, flow resistance in the particulate filter increases and a back pressure of the engine increases. As a result, an output of the engine will be deteriorated. Therefore, the particulate filter is regenerated by reducing the exhaust particulate matters collected in the particulate filter at appropriate timing. A system capable of regenerating the particulate filter during operation of the engine uses oxidizing properties of an oxidation catalyst such as platinum disposed on the particulate filter.

As modes of the regeneration of the particulate filter for combusting and reducing the deposited exhaust particulate matters, there are a mode of spontaneous regeneration and a mode of compulsory regeneration. In the spontaneous regeneration mode, the deposited exhaust particulate matters are combusted and reduced spontaneously by heat of the exhaust gas, of which temperature is increased to a high temperature when a vehicle driver presses down an accelerator and a fuel injection quantity increases, for instance. In the compulsory regeneration mode, the deposited exhaust particulate matters are combusted and reduced compulsorily. For instance, in the compulsory regeneration, a post-injection for injecting fuel in an exhaustion stroke is performed to supply the fuel to the particulate filter. Thus, the deposited exhaust particulate matters, which are more difficult to oxidize than the injected fuel, are oxidized and reduced with the use of heat generated by combusting the supplied fuel. The temperature of the exhaust gas can also be increased by retarding fuel injection timing.

The spontaneous regeneration occurs in accordance with accelerator manipulation of the vehicle driver. Therefore, the spontaneous regeneration occurs on an irregular basis. The compulsory regeneration can be performed anytime.

If the compulsory regeneration is performed frequently, a fuel cost will increase. If a time interval to the next generation is too long, the quantity of the deposited exhaust particulate matters will increase excessively. In such a case, the exhaust particulate matters will be combusted rapidly in the next regeneration and the particulate filter will be heated to an abnormally high temperature. There is a possibility that the particulate filter is damaged. Therefore, the regeneration timing should be preferably determined by calculating the deposition quantity of the exhaust particulate matters based on operating states of the engine. The flow resistance increases as the deposition quantity of the exhaust particulate matters in the particulate filter increases. A differential pressure between an inlet and an outlet of the particulate filter increases as the flow resistance increases. Therefore, a system disclosed in JP-A-H07-332065 (Patent Document 1) senses the differential pressure and determines that the regeneration timing is reached if the sensed differential pressure exceeds a predetermined value.

A combustion speed of the deposited exhaust particulate matters is not necessarily even in the particulate filter. There is a possibility that a variation in the deposition in the particulate filter increases because of the repetition of the spontaneous regeneration and the deposition if the combustion speed is uneven in the particulate filter. Moreover, in the compulsory regeneration, regeneration efficiency decreases as the regeneration progresses, or as a quantity of remaining exhaust particulate matters decreases and the deposition quantity decreases. Therefore, the deposited exhaust particulate matters should be preferably eliminated, or the deposition quantity should be preferably decreased to zero, only in one compulsory regeneration operation while multiple compulsory regeneration operations are performed. The other compulsory regeneration operations should be preferably ended in a state in which the exhaust particulate matters remain in the particulate filter. However, in this scheme, there is a possibility that a deposition distribution inside the particulate filter enlarges further. The system of Patent Document 1 can grasp an average deposition state, but cannot grasp the deposition distribution. Therefore, there is a possibility that the rapid combustion occurs in some portions in the particulate filter.

SUMMARY OF THE INVENTION

It is therefore an object of the present invention to provide an exhaust gas purification system of an internal combustion engine capable of effectively inhibiting rapid combustion of deposited exhaust particulate matters when a particulate filter is regenerated.

According to an aspect of the present invention, an exhaust gas purification system of an internal combustion engine includes a particulate filter in an exhaust passage of the engine for collecting exhaust particulate matters contained in exhaust gas. Regeneration of the particulate filter for combusting and reducing exhaust particulate matters deposited on the particulate filter is performed by spontaneous regeneration and compulsory regeneration. In the spontaneous regeneration, the deposited exhaust particulate matters are spontaneously combusted by an increase of temperature of the exhaust gas. In the compulsory regeneration, the deposited exhaust particulate matters are compulsorily combusted and reduced when a present deposition quantity of the exhaust particulate matters exceeds a predetermined upper limit value. The present deposition quantity is calculated based on operating states of the engine. The exhaust gas purification system includes determining means and controlling means. The determining means determines whether the spontaneous regeneration occurs or not based on the operating states of the engine. The controlling means completes the compulsory regeneration to eliminate the deposited exhaust particulate matters if the determining means determines that the spontaneous regeneration stops after a start of the spontaneous regeneration and the deposition quantity becomes equal to or less than a predetermined reset value.

If the temperature of the exhaust gas increases to a certain temperature, at which the exhaust particulate matters can be combusted spontaneously, due to a change in the operating states of the engine, the exhaust particulate matters are combusted and reduced. Thus, the spontaneous regeneration occurs. If the deposition quantity of the exhaust particulate matter decreases when the spontaneous regeneration occurs, there is a good chance that the combustion of the deposited exhaust particulate matters cumulatively progresses. In such a case, it can be estimated that a deposition variation in the particulate filter is enlarged. Therefore, it can be estimated that the deposition variation in the particulate filter is enlarged if the deposition quantity calculated based on the operating states of the engine becomes lower than the predetermined reset value, which is set by taking into account deterioration of estimation accuracy due to the enlargement of the deposition variation. The deposited exhaust particulate matters are substantially eliminated by completing the compulsory regeneration. Thus, the enlargement of the deposition variation can be avoided and partial rapid combustion in the particulate filter can be effectively prevented.

According to another aspect of the present invention, the exhaust gas purification system includes distribution measuring means for measuring a combustion distribution of the deposited exhaust particulate matters in the particulate filter and bias calculating means for calculating a deposition bias indicating a deposition variation of the exhaust particulate matters in the particulate filter based on the combustion distribution in the particulate filter. The controlling means completes the compulsory regeneration to eliminate the exhaust particulate matters if the deposition bias exceeds a predetermined reference value.

The deposition quantity of the exhaust particulate matters deposited in the particulate filter varies because the combustion of the deposited exhaust particulate matters varies inside the particulate filter. The exhaust gas purification system calculates the deposition bias based on the combustion distribution and compares the deposition bias with the reference value. Thus, the exhaust gas purification system determines whether the deposition variation in the particulate filter is large or not. If the deposition bias exceeds the reference value, the compulsory regeneration is performed to eliminate the deposited exhaust particulate matters substantially completely. Thus, the deposition quantity can be prevented from increasing excessively in a portion of the particulate filter. As a result, the occurrence of the partial rapid combustion in the particulate filter can be effectively prevented.

According to yet another aspect of the present invention, the exhaust gas purification system includes quantity calculating means for calculating a deposition quantity of the exhaust particulate matters deposited in a maximum deposition portion of the particulate filter based on the operating states of the engine including the combustion distribution in the particulate filter. The controlling means completes the compulsory regeneration to eliminate the deposited exhaust particulate matters if the deposition quantity at the maximum deposition portion exceeds a predetermined reference value.

If the combustion of the deposited exhaust particulate matters varies in the particulate filter, the deposition quantity of the exhaust particulate matters in the particulate filter varies. It can be determined whether the deposition variation in the particulate filter is large or not by calculating the deposition quantity at the maximum deposition portion based on the combustion distribution and by comparing the deposition quantity with the reference value. If the deposition quantity exceeds the reference value, the compulsory regeneration is performed to eliminate the deposited exhaust particulate matters substantially completely. Thus, the deposition quantity can be prevented from increasing excessively in a portion of the particulate filter. As a result, the occurrence of the partial rapid combustion in the particulate filter can be effectively prevented.

The maximum deposition portion is a portion where the possibility of the occurrence of the rapid combustion is the highest. It is determined whether the deposited exhaust particulate matters should be completely eliminated or not based on the deposition quantity at the maximum deposition portion. Thus, the rapid combustion can be avoided and the increase in the frequency of the complete regeneration can be limited.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

First Embodiment

Figure 1:
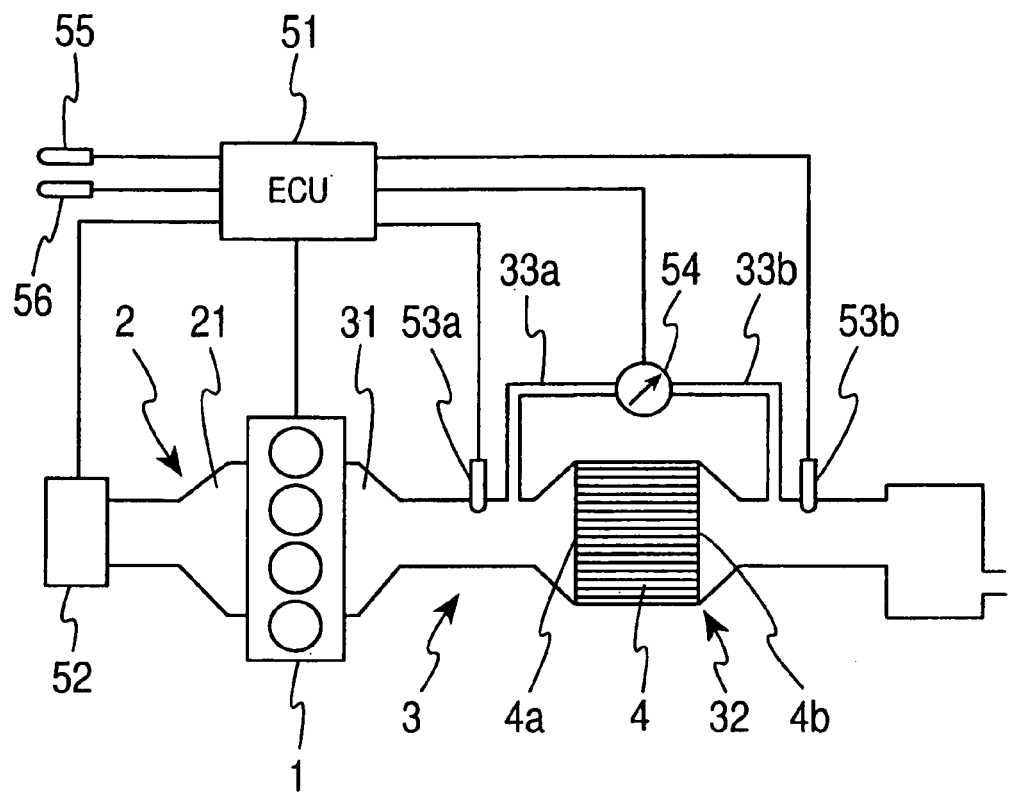
FIG. 1 is a schematic diagram showing an exhaust gas purification system of an internal combustion engine according to a first embodiment of the present invention.

Referring to FIG. 1, a diesel engine according to a first embodiment of the present invention is illustrated.

An engine main body 1 of the diesel engine shown in FIG. 1 is equipped with four cylinders. The engine main body 1 is connected with an intake manifold 21 as the most downstream portion of an intake passage 2 and with an exhaust manifold 31 as the most upstream portion of an exhaust passage 3. The exhaust passage 3 is connected with a particulate filter (a diesel particulate filter: DPF) 32 at a gathering portion of the exhaust manifold 31. A main body 4 of the particulate filter 32 is a honeycomb structure, which is made of a porous ceramic such as cordierite or silicon carbide and is formed in the shape of a circular column. An opening of each passage of the honeycomb structure is blocked on an end side thereof in an axial direction. Exhaust gas discharged from the cylinders of the engine main body 1 enters the DPF main body 4 through an inlet 4a, which opens in an end of the DPF main body 4. Then, the exhaust gas flows in the axial direction along a porous partition wall inside the DPF main body 4 and permeates and passes through the partition wall. Then, the exhaust gas flows toward a downstream portion of the exhaust passage 3 through an outlet 4b opening in the other end of the DPF main body 4. At that time, exhaust particulate matters contained in the exhaust gas are collected by the DPF 32 and are deposited in accordance with a travel distance. An oxidation catalyst, of which main components are noble metals such as platinum or palladium, is supported on the surface of the DPF main body 4. The oxidation catalyst oxidizes and combusts the exhaust particulate matters under a predetermined temperature condition to reduce the exhaust particulate matters.

An electronic control unit (ECU) 51 for controlling various parts of the engine such as injectors of the engine main body 1 is provided.

Various types of signals indicating operating states are inputted to the ECU 51. Sensors for measuring a quantity of the exhaust particulate matters deposited in the DPF 32 (a PM deposition quantity) are provided, and signals for measuring the PM deposition quantity are also inputted to the ECU 51. More specifically, temperature sensors 53a, 53b are mounted to the exhaust passage 3 so that the temperature sensors 53a, 53b penetrate a wall of a pipe providing the exhaust passage 3. Thus, the temperature sensors 53a, 53b sense a temperature of the exhaust gas at the DPF 32 (DPF temperature Tdpf). The temperature sensor 53a is disposed immediately upstream of the DPF 32 and the temperature sensor 53b is disposed immediately downstream of the DPF 32. The temperature sensed by the temperature sensor 53a can be regarded as the temperature of the exhaust gas at the inlet 4a of the DPF main body 4, or DPF inlet temperature TIN. The temperature sensed by the temperature sensor 53b can be regarded as the temperature of the exhaust gas at the outlet 4b of the DPF main body 4, or DPF outlet temperature TOUT.

The exhaust passage 3 is connected with a first branch passage 33a branching from the exhaust passage 3 at a point immediately upstream of the DPF 32 and with a second branch passage 33b branching from the exhaust passage 3 at a point immediately downstream of the DPF 32. A differential pressure sensor 54 is interposed between the first and second branch passages 33a, 33b and senses a differential pressure between the inlet 4a and the outlet 4b. The differential pressure indicates a pressure loss at the DPF 32.

An air flow meter 52 is disposed upstream of the intake manifold 21 in the intake passage 2. The air flow meter 52 senses a quantity of intake air.

A pressure sensor is mounted on a lower side of a vehicle, in which the engine is mounted, as an atmospheric pressure sensor 55 for sensing an atmospheric pressure of an ambient air, or a pressure of an atmosphere in which the exhaust passage 3 is disposed. A temperature sensor is mounted on the lower side of the vehicle as an ambient temperature sensor 56 for sensing ambient temperature.

Sensor signals indicating operating states such as an accelerator position and a cooling water temperature are inputted to the ECU 51.

The ECU 51 has general structure centering on a microcomputer. ROM of the ECU 51 stores control programs for controlling various parts of the engine and programs for calculating the deposited state of the particulate matters in the DPF 32, or the PM deposition quantity. It is determined whether the DPF 32 should be regenerated or not based on the calculated PM deposition quantity.

Figure 2:
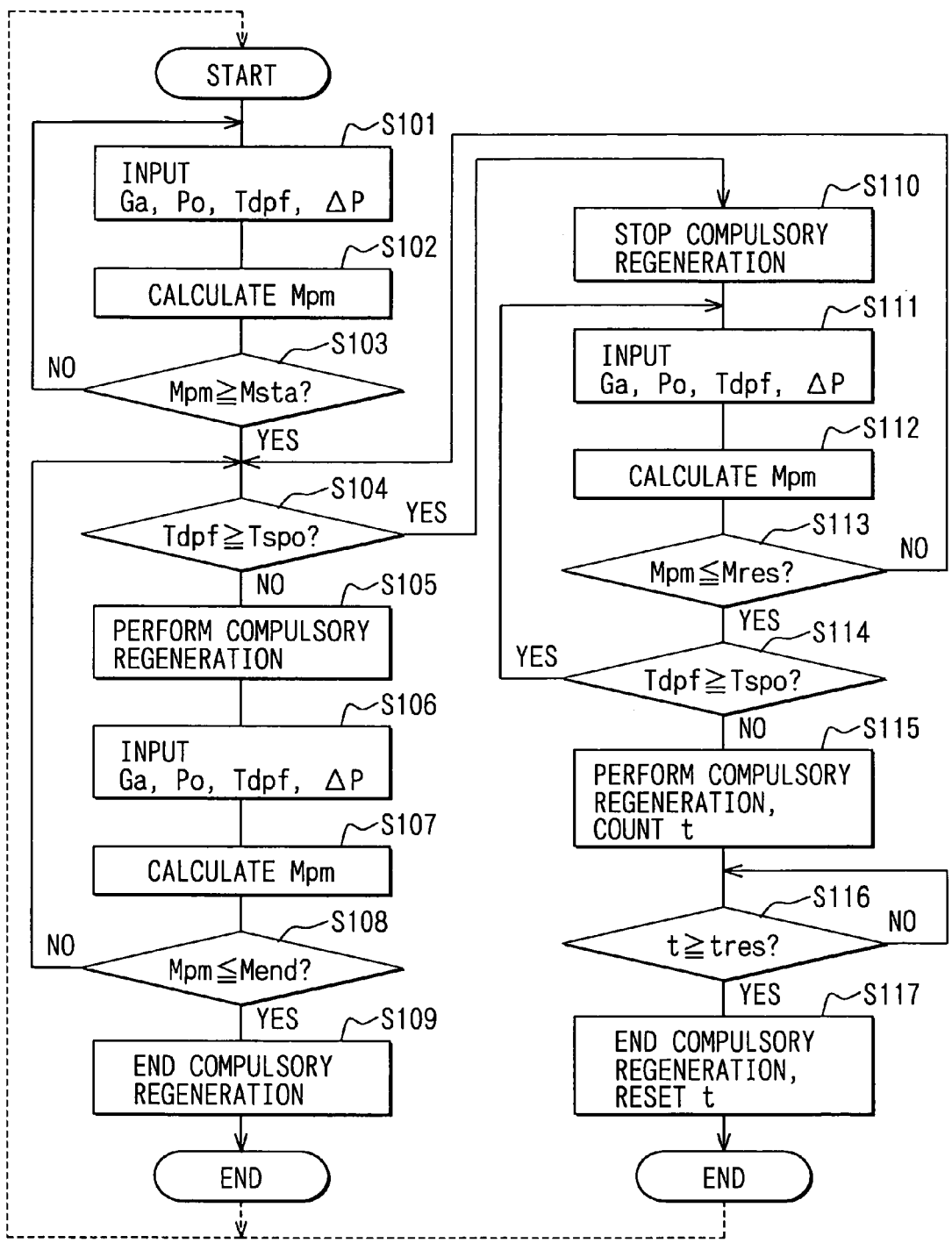
FIG. 2 is a flowchart showing control performed by an electronic control unit of the exhaust gas purification system according to the first embodiment.

Next, steps of control of the regeneration of the DPF 32 performed by the ECU 51 will be explained based on a flowchart shown in FIG. 2.

First, in Step S101, the intake air quantity Ga, the atmospheric pressure P0, the DPF temperature Tdpf and the DPF pressure loss $\Delta P$ are inputted. The intake air quantity Ga is a mass flow rate. The DPF temperature Tdpf includes the DPF inlet temperature TIN and the DPF outlet temperature TOUT.

Then, in Step S102, the PM deposition quantity Mpm is calculated based on the above data (parameters). More specifically, the intake air quantity Ga is converted into a volumetric flow rate of the exhaust gas passing through the DPF 32 by regarding the atmospheric pressure P0 and the DPF temperature Tdpf as states (a pressure and temperature) of the exhaust gas passing through the DPF 32. In the conversion, an average of the DPF inlet temperature TIN and the DPF outlet temperature TOUT is used as the representative value of the temperature inside the DPF 32. Then, the PM deposition quantity Mpm is calculated in accordance with the obtained volumetric flow rate and the DPF pressure loss $\Delta P$ based on a map or a characteristic formula. Instead of regarding the atmospheric pressure P0 as the pressure of the exhaust gas passing through the DPF 32, the pressure of the exhaust gas passing through the DPF 32 may be calculated by taking into account a pressure loss at the exhaust passage 3 downstream of the DPF 32 and the pressure loss at the DPF 32 (referred to as a downstream exhaust pipe pressure loss, hereafter). In this case, the downstream exhaust pipe pressure loss should be preferably calculated by multiplying the volumetric flow rate of the exhaust gas with a predetermined coefficient. In addition, an increase of the volume due to the combustion may be taken into account when the volumetric flow rate of the exhaust gas passing through the DPF 32 is calculated.

Then, in Step S103, it is determined whether the PM deposition quantity Mpm is "equal to or greater than" a regeneration start PM quantity Msta as an upper limit value. If the result of the determination in Step S103 is "NO", the ECU 51 returns to Step S101. If the result of the determination in Step S103 is "YES", the ECU 51 proceeds to Step S104.

In Step S104, it is determined whether the DPF temperature Tdpf is "equal to or higher than" a PM spontaneous regeneration temperature Tspo as a reference value of spontaneous regeneration. The average of the DPF inlet temperature TIN and the DPF outlet temperature TOUT can be employed as the DPF temperature Tdpf. Alternatively, any other representative temperature representing the temperature in the DPF 32 may be employed. The spontaneous regeneration is a phenomenon in which a change in the engine operating state increases the exhaust gas temperature to a temperature enabling spontaneous combustion of the exhaust particulate matters and the exhaust particulate matters are combusted and reduced. The PM spontaneous regeneration temperature Tspo is set based on an activation temperature of the oxidation catalyst of the DPF 32. If the result of the determination in Step S104 is "NO", compulsory regeneration is performed in Step S105. Post-injection is performed in the compulsory regeneration, for instance.

Then, in Step S106, the intake air quantity Ga, the atmospheric pressure P0, the DPF temperature Tdpf and the DPF pressure loss ΔP are inputted as in Step S101. Then, in Step S107, the PM deposition quantity Mpm is calculated based on these parameters as in Step S102. Then, in Step S108, it is determined whether the PM deposition quantity Mpm is "equal to or less than" a regeneration end PM quantity Mend. If the result of the determination in Step S108 is "YES", the compulsory regeneration is ended in Step S109. The regeneration end PM quantity Mend is a reference value for ending the compulsory regeneration. The regeneration end PM quantity Mend is set to a value low enough to alleviate an increase of a back pressure of the engine due to the deposition of the exhaust particulate matters. However, in the case where the regeneration end PM quantity Mend is set to a too low value, regeneration speed decreases as a regeneration period elapses even if the post-injection quantity is maintained substantially at the initial quantity. As a result, the fuel is consumed uselessly in the post-injection. The regeneration speed is progression speed of the combustion and the reduction of the deposited exhaust particulate matters. Therefore, the regeneration end PM quantity Mend is set to a relatively large value so that the compulsory regeneration is ended while the regeneration speed is sufficiently high and the regeneration is performed relatively efficiently.

If the result of the determination in Step S108 is "NO", the ECU 51 returns to Step S104. Therefore, the compulsory regeneration of the DPF 32 is continuously performed unless the DPF temperature Tdpf reaches the PM spontaneous regeneration temperature Tspo.

If the result of the determination in Step S104 is "YES", processing of Step S110 and following steps is performed. In Step S110, the compulsory regeneration is stopped. It is because the DPF temperature Tdpf has reached the PM spontaneous regeneration temperature Tspo and the spontaneous regeneration can occur.

Then, in Step S111, the intake air quantity Ga, the atmospheric pressure P0, the DPF temperature Tdpf, and the DPF pressure loss ΔP are inputted as in Step S101. Then, in Step S112, the PM deposition quantity Mpm is calculated based on these parameters as in Step S102.

Then, In Step S113, it is determined whether the PM deposition quantity Mpm is "equal to or less than" a reset PM quantity Mres as a predetermined value (a lower limit value). The reset PM quantity Mres is set at a value less than the regeneration end PM quantity Mend. If the combustion progresses and a deposition variation between a combusted portion in which the exhaust particulate matters have been already combusted and a non-combusted portion in which the exhaust particulate matters have not been combusted yet in the DPF 32 exceeds a limit value, deterioration of estimation accuracy becomes unacceptable. Moreover, the deposition variation tends to increase as the quantity of the exhaust particulate matters remaining in the DPF 32 decreases. Therefore, the reset PM quantity Mres should be preferably set at a sensed value of the quantity of the exhaust particulate matters remaining in the DPF 32 corresponding to the limit value of the deposition variation. If the result of the determination in Step S113 is "NO", the ECU 51 returns to Step S104. If the result of the determination in Step S113 is "YES", it is determined whether the DPF temperature Tdpf is "equal to or higher than" the PM spontaneous regeneration temperature Tspo in Step S114. If the result of the determination in Step S114 is "YES", the ECU 51 returns to Step S111. If the result of the determination in Step S114 is "NO", the ECU 51 proceeds to Step S115. Therefore, if the spontaneous regeneration state disappears after the PM deposition quantity Mpm becomes equal to or lower than the reset PM quantity Mres due to the progression of the spontaneous regeneration, processing of Step S115 and following steps is performed. More specifically, the processing of Step S115 and the following steps is performed under a condition that the PM deposition quantity Mpm becomes equal to or less than the reset PM quantity Mres in the spontaneous regeneration state.

In Step S115, the compulsory regeneration of the DPF 32 is performed in order to continue the regeneration of the DPF 32 although the temperature is not high enough for the spontaneous regeneration. Meanwhile, a time counter t is started to measure an elapsed time t after the compulsory regeneration is started in Step S115. It is determined whether the elapsed time t exceeds a reset regeneration time tres in Step S116. The processing of Step S116 is repeated until the elapsed time t exceeds the reset regeneration time tres. If the result of the determination in Step S116 is "YES", the compulsory regeneration is ended and the time counter t is reset in Step S117. The reset regeneration time tres is set so that the deposited exhaust particulate matters in the DPF 32 are surely and completely combusted and eliminated by the time when the reset regeneration time tres passes after the compulsory regeneration is started at the time when the PM deposition quantity Mpm coincides with the reset PM quantity Mres. More specifically, the reset regeneration time tres is set to a time for completely combusting the exhaust particulate matters deposited even in a maximum deposition portion of the exhaust particulate matters (a portion where the deposition of the exhaust particulate matters is maximized) in the DPF 32.

As explained above, the exhaust gas purification system of the present embodiment performs the compulsory regeneration when the operating state of the diesel engine is out of the spontaneous regeneration state and the PM deposition quantity Mpm reaches the regeneration start PM quantity Msta. The compulsory regeneration is continued until the PM deposition quantity Mpm decreases to the regeneration end PM quantity Mend. If the spontaneous regeneration state occurs, the compulsory regeneration is stopped for a corresponding period to reduce the consumption of the fuel used in the post-injection. The compulsory regeneration is suspended until the spontaneous regeneration state disappears because the compulsory regeneration is unnecessary during the spontaneous regeneration.

If the PM deposition quantity Mpm decreases to the reset PM quantity Mres during the spontaneous regeneration, the compulsory regeneration is performed for an adequate time to eliminate the exhaust particulate matters deposited in the DPF 32.

Figure 3:
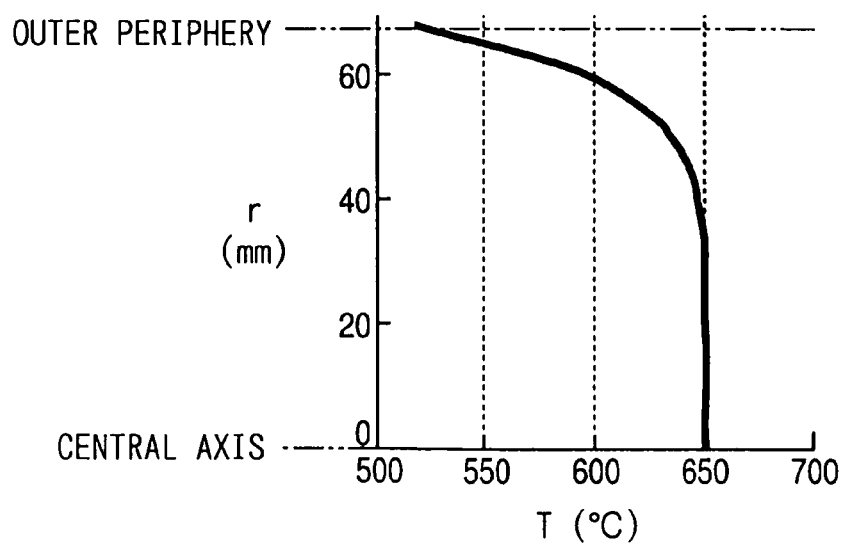
FIG. 3 is a graph showing a temperature distribution in a particulate filter of the exhaust gas purification system according to the first embodiment.

Heat can be easily drawn from an outer peripheral portion of the DPF 32 and the temperature at the outer peripheral portion tends to decrease as shown in a graph of FIG. 3. The graph of FIG. 3 shows a distribution of the temperature T of the DPF 32 along a radial direction. A sign r in FIG. 3 indicates a distance from a central axis of the DPF 32. A combustion speed Cpm of the exhaust particulate matters decreases as the temperature T decreases as shown in a graph of FIG. 4. Therefore, a combustion distribution in the DPF 32 during the regeneration is formed so that the combustion speed Cpm is high at the central portion, where the temperature T is high, and the combustion speed Cpm is low at the outer peripheral portion, where the temperature T is low. The PM deposition quantity decreases more in the high-temperature portion (the central portion) than in the low-temperature portion (the outer peripheral portion).

Therefore, a distribution variation occurs between the combusted portion in which the exhaust particulate matters have been already combusted and the non-combusted portion in which the exhaust particulate matters have not been combusted yet in the DPF 32. Specifically, a rapid decrease of the exhaust gas temperature or an oxygen quantity in the exhaust gas tends to occur during the spontaneous regeneration because of the change in the operating state of the engine, so the spontaneous regeneration breaks. In such a case, the deposition variation between the combusted portion and the non-combusted portion in the DPF 32 tends to increase. The estimation accuracy of the PM deposition quantity (the total quantity) in the DPF 32 is deteriorated as the deposition variation increases. If a subsequent PM deposition quantity is added to the estimate of the PM deposition quantity, which is calculated at the deteriorated accuracy, and if the compulsory regeneration is performed based on the summation of the PM deposition quantities, a deposition density will increase in a portion in the DPF 32 where the non-combusted portion of the exhaust particulate matters is easily formed. In such a case, there is a possibility that the combustion temperature increases excessively when the regeneration is performed.

If the pattern of the stoppage of the spontaneous regeneration is repeated, the exhaust particulate matters will be cumulatively deposited in the portion where the non-combusted portion can be easily formed in the DPF 32. Specifically, if a certain condition, under which the high-temperature exhaust gas rapidly heated by the spontaneous regeneration accelerates the ignition of the deposited exhaust particulate matters, is established, there is a possibility that the combustion temperature increases excessively.

Therefore, in the present embodiment, the compulsory regeneration is performed continuously until the deposited exhaust particulate matters are substantially eliminated if the PM deposition quantity Mpm is equal to or less than the predetermined value (the reset PM quantity Mres) during the stoppage of the spontaneous regeneration. Thus, the deposited exhaust particulate matters are eliminated by completing the compulsory regeneration. Accordingly, history of the deposition of the exhaust particulate matters in the DPF 32 can be wiped out and factors, which are caused in the previous process and deteriorate the estimation accuracy of the PM deposition quantity, can be eliminated. As a result, occurrence of the abnormally high temperature during the combustion process of the exhaust particulate matters in the DPF 32 can be avoided.

Figure 5:
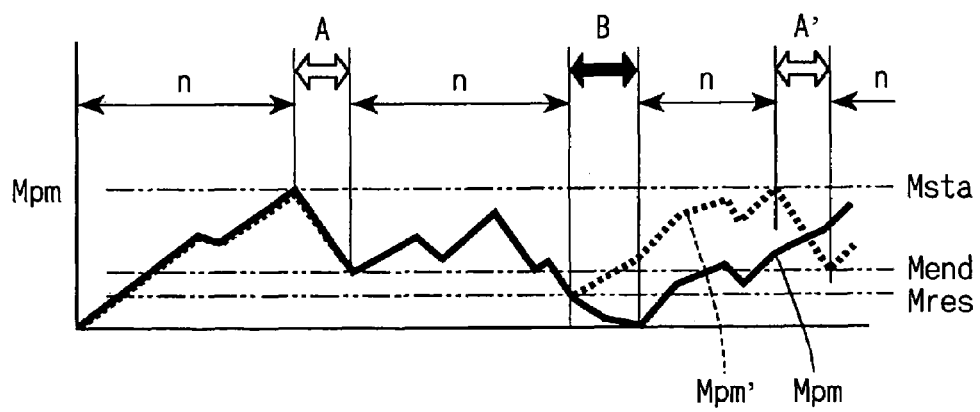
FIG. 5 is a time chart showing a transition of a deposition quantity of the exhaust particulate matters during operation of the exhaust gas purification system according to the first embodiment.
Figure 6:
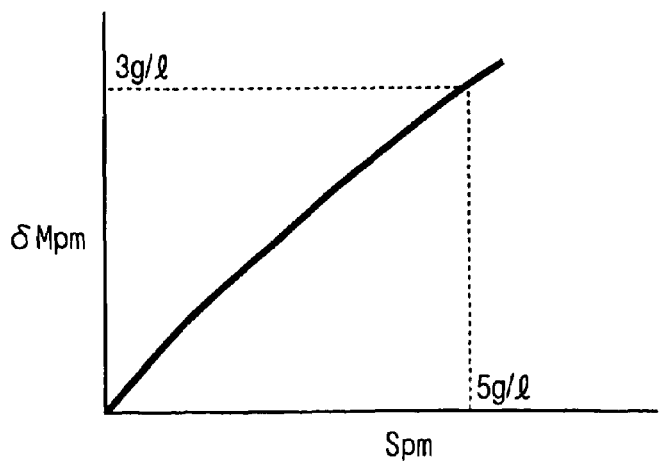
FIG. 6 is a graph showing a relationship between an accumulated value of a combustion quantity of the exhaust particulate matters and a deposition variation of remaining exhaust particulate matters in the particulate filter according to the first embodiment.

A transition of the PM deposition quantity Mpm is shown in a time chart of FIG. 5. If the PM deposition quantity Mpm reaches the regeneration start PM quantity Msta, the compulsory regeneration is performed as shown in a range A of FIG. 5. Usual operation is performed in ranges n in FIG. 5. The PM deposition quantity Mpm decreases even if the compulsory regeneration is not performed, in periods in which the spontaneous regeneration occurs. The PM deposition quantity Mpm changes while the deposition of the exhaust particulate matters and the combustion and the reduction of the exhaust particulate matters by the regeneration are repeated. In the period in which the regeneration is performed, a bias of the PM deposition quantity enlarges because of a bias of the combustion speed in the DPF 32. A relationship between the PM deposition quantity variation $\delta$Mpm and a PM combustion quantity accumulation value Spm (an accumulated value of the quantity of the exhaust particulate matters combusted after the exhaust particulate matters are deposited evenly) at the vehicle speed of 20 km/h is shown in a graph of FIG. 6. The PM deposition quantity variation $\delta$Mpm shown in FIG. 6 is calculated by subtracting the PM deposition quantity (a minimum PM deposition quantity) at a minimum deposition portion in the DPF 32, where the smallest quantity of the exhaust particulate matters are deposited, from the PM deposition quantity (a maximum PM deposition quantity) at a maximum deposition portion in the DPF 32, where the largest quantity of the exhaust particulate matters are deposited. As shown in FIG. 6, the PM deposition quantity variation $\delta$Mpm increases as the combustion progresses.

In an exhaust gas purification system of a related art, the deposition of the exhaust particulate matters progresses while the PM deposition quantity is biased inside the DPF. If the PM deposition quantity Mpm calculated from the DPF pressure loss $\Delta$P and the exhaust gas flow rate reaches the regeneration start PM quantity Msta again as shown by a broken line Mpm' of FIG. 5 and the compulsory regeneration is performed in a range A', there is a possibility that the rapid combustion occurs at the outer peripheral portion where the PM deposition quantity is large.

In contrast, in the present embodiment, if the PM deposition quantity Mpm decreases to the reset PM quantity Mres because of the spontaneous regeneration, the deposited exhaust particulate matters are eliminated by completing the compulsory regeneration as shown in a range B of FIG. 5. Thus, the PM deposition quantity Mpm is decreased to zero as shown by a solid line Mpm in FIG. 5. Therefore, even if the PM deposition quantity Mpm increases to the regeneration start PM quantity Msta again subsequently, the PM deposition quantity at the outer peripheral portion (the maximum deposition portion) of the DPF 32 can be prevented from increasing excessively. Thus, the rapid combustion of the exhaust particulate matters can be prevented.

When the compulsory regeneration is performed to eliminate the exhaust particulate matters, the reset regeneration time tres is set long enough to eliminate the exhaust particulate matters. If the DPF temperature Tdpf exceeds the PM spontaneous regeneration temperature Tspo in the course of the compulsory regeneration, the compulsory regeneration may be suspended while the DPF temperature Tdpf exceeds the PM spontaneous regeneration temperature Tspo so that only the spontaneous regeneration is performed.

In this case, the reset regeneration time tres may be reduced in accordance with the time length of the spontaneous regeneration.

It is determined whether the spontaneous regeneration can occur by comparing the DPF temperature Tdpf with the PM spontaneous regeneration temperature Tspo. Alternatively, it may be determined whether the operating state of the diesel engine is a certain operating state in which the spontaneous regeneration can occur, based on the operating state of the engine such as an engine rotation speed or a load. In this case, a correspondence between the operating state of the engine and the DPF temperature Tdpf is obtained and the correspondence is stored in the ECU 51 as a map beforehand.

Second Embodiment

Next, steps of control performed by an ECU 51 of an exhaust gas purification system of an internal combustion engine according to a second embodiment will be explained based on a flowchart shown in FIG. 7.

The ECU 51 calculates the PM deposition quantity Mdpf like the first embodiment. If the PM deposition quantity Mdpf exceeds the regeneration start PM quantity Msta, the compulsory regeneration is started. The compulsory regeneration is continued until the PM deposition quantity Mpm decreases to the regeneration end PM quantity Mend except in a period in which the DPF temperature Tdpf is equal to or higher than the PM spontaneous regeneration temperature Tspo.

Figure 7:
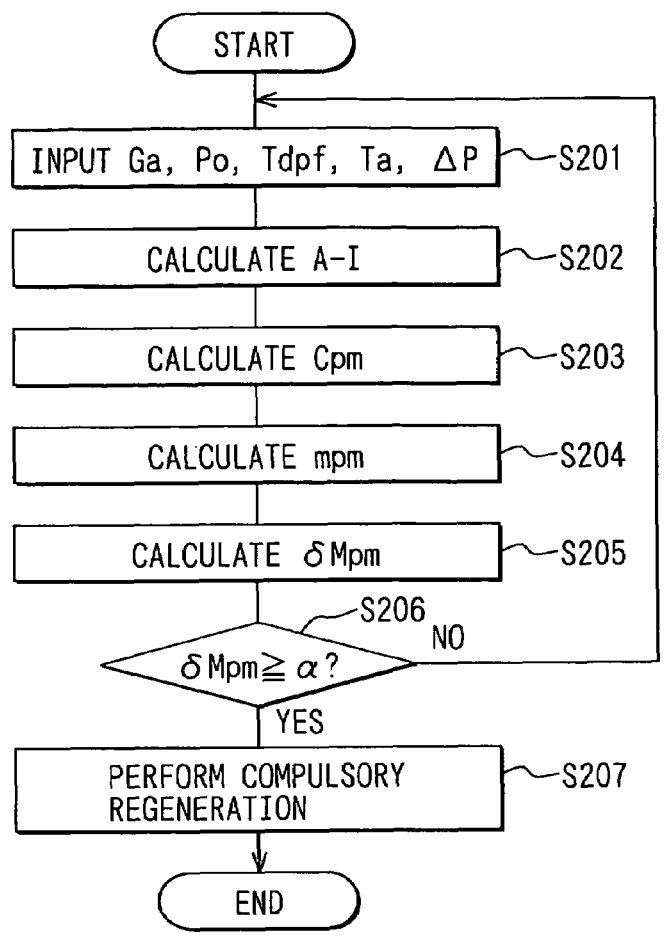
FIG. 7 is a flowchart showing control performed by an electronic control unit of an exhaust gas purification system of an internal combustion engine according to a second embodiment of the present invention.

In Step S201 of the flowchart of FIG. 7, the intake air quantity Ga, the atmospheric pressure P0, the exhaust gas temperature Tdpf, an ambient temperature Ta and the DPF pressure loss ΔP are inputted.

Figure 8:
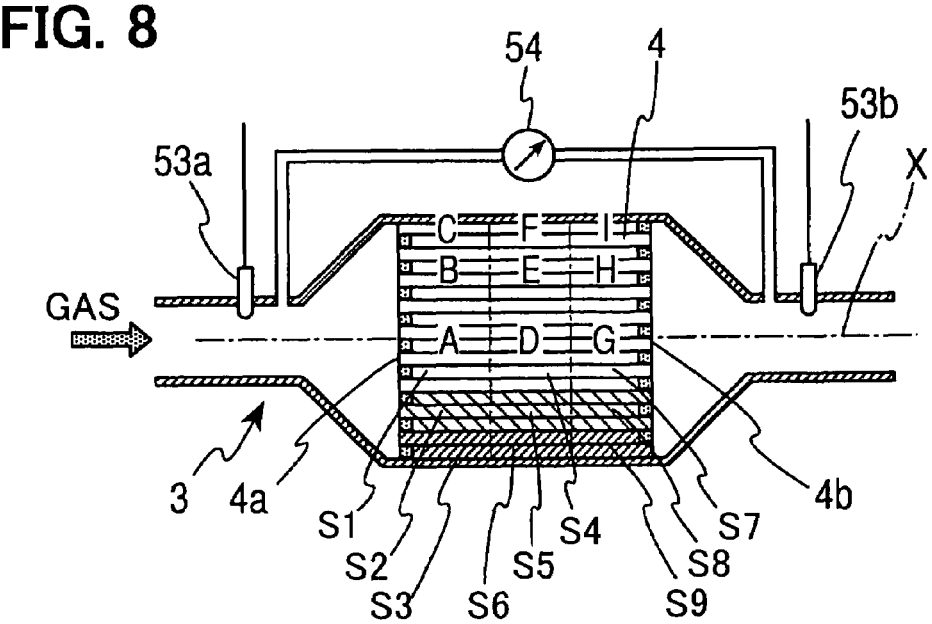
FIG. 8 is a longitudinal sectional view showing a particulate filter of the exhaust gas purification system according to the second embodiment.
Figure 9:
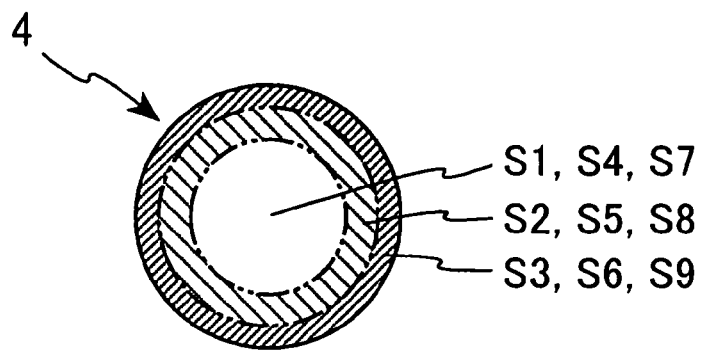
FIG. 9 is a sectional view showing the particulate filter according to the second embodiment.

Then, in Step S202, a temperature distribution in the DPF 32 is calculated based on the inputted exhaust gas temperature Tdpf. The DPF main body 4 is partitioned into three portions along the central axis X directed from the inlet 4a to the outlet 4b of the DPF 32, and then, each partitioned portion is radially partitioned into three portions as shown in FIGS. 8 and 9. Thus, the DPF main body 4 is partitioned into nine spaces S1, S2, S3, S4, S5, S6, S7, S8, S9. The temperature distribution in the DPF 32 is calculated by estimating representative temperatures of the respective spaces S1-S9. Axial sizes of the spaces S1-S9 are the same as each other and cross-sectional areas of the spaces S1-S9 (on planes perpendicular to the central axis X) are the same as each other. Thus, volumes of the respective spaces S1-S9 are substantially equalized to each other and basic collecting abilities of the respective spaces S1-S9 for collecting the exhaust particulate matters are substantially equalized to each other. The spaces S1, S2, S3 are the closest to the inlet 4a of the DPF 32 and are arranged in that order from the central portion toward the outer periphery of the DPF 32. The spaces S4, S5, S6 are positioned in the middle of the DPF 32 with respect to the central axis X and are arranged in that order from the central portion toward the outer periphery of the DPF 32. The spaces S7, S8, S9 are the closest to the outlet 4b of the DPF 32 and are arranged in that order from the central portion toward the outer periphery of the DPF 32.

The temperatures at the respective spaces S1-S9 are estimated based on the DPF inlet temperature TIN and the ambient temperature Ta, for instance. Points for estimating the temperatures are set in the respective spaces S1-S9 on a one-on-one basis. More specifically, the temperature estimation points A, B, C, D, E, F, G, H, I are respectively set in the spaces S1-S9. For instance, the temperature estimation points A-I are set at the respective centers of the spaces S1-S9. The signs A-I also denote the temperatures sensed at the points A-I, hereafter.

In the estimation processing of the temperatures A-I, the temperatures A, D, G at the points A, D, G on the central axis X are estimated based on the DPF inlet temperature TIN, first. Then, the temperatures B, C at the points B, C of the spaces S2, S3 provided coaxially with the space S1 are estimated based on the temperature A. The temperatures E, F at the points E, F of the spaces S5, S6 provided coaxially with the space S4 are estimated based on the temperature D. The temperatures H, I at the points H, I of the spaces S8, S9 provided coaxially with the space S7 are estimated based on the temperature G.

A model for estimating the temperatures A, D, G at the points A, D, G on the central axis X is expressed by a transfer function T(s) (a following formula (1)) consisting of a first-order lag and a dead time. The model T(s) uses the DPF inlet temperature TIN as an input. In the formula (1), a sign T represents a time constant and a sign L is the dead time.

$$T(s) = [1/(1+Ts)] \cdot e^{-Ls}, \quad (1)$$

The change in the temperature in the DPF 32 can be regarded as step response to the change in the DPF inlet temperature TIN. More specifically, if the DPF inlet temperature TIN, or the temperature of the exhaust gas entering the DPF 32, changes stepwise, the change reaches the points A, D, G. Since it takes some time for the change to reach the points downstream of the temperature sensor 53a sensing the DPF inlet temperature TIN, the temperatures A, D, G change in retard of the change in the DPF inlet temperature TIN. Then, the temperatures A, D, G converge to the value of the DPF inlet temperature TIN. Therefore, the temperatures in the DPF 32 can be suitably estimated by the model expressed by the transfer function consisting of the first-order lag and the dead time.

The lag at a certain point lengthens as the certain point recedes from the temperature sensor 53a. Therefore, the lag is the longest at the point G. Profiles of the changes of the temperatures A, D, G to follow the DPF inlet temperature TIN, or profiles of the following changes, are gentle due to a relatively large heat capacity of the DPF main body 4, of which the base material is the ceramic. A speed of the following change at a certain point decreases as the certain point recedes downstream from the temperature sensor 53a. Therefore, the speed of the following change is the lowest at the point G. As the flow rate and the flow velocity of the exhaust gas increase, the lag shortens as a whole and the speed of the following change increases. Accordingly, the dead time L at a certain point is increased as the certain point recedes from the temperature sensor 53a, and is decreased as the flow rate of the exhaust gas increases. The time constant T at a certain point is increased as the certain point recedes from the temperature sensor 53a, and is decreased as the flow rate of the exhaust gas increases.

Thus, the temperatures A, D, G at the points A, D, G on the central axis X of the DPF main body 4 can be estimated from the DPF inlet temperature TIN. Thus, the temperature distribution along the central axis X of the DPF main body 4 can be obtained.

The temperatures in the spaces provided coaxially with the spaces 1, 4, 7 are estimated from the temperatures A, D, G, which are estimated at the points on the central axis X, and the ambient temperature Ta based on a map and the like associating the temperatures of the respective spaces with the temperatures A, D, G and the ambient temperature Ta. The map is provided so that the temperature is high on the central axis X side and lowers toward the outer peripheral portion side. It is because effects of the heat drawn by the ambient air occur on the outer peripheral portion side.

Figure 4:
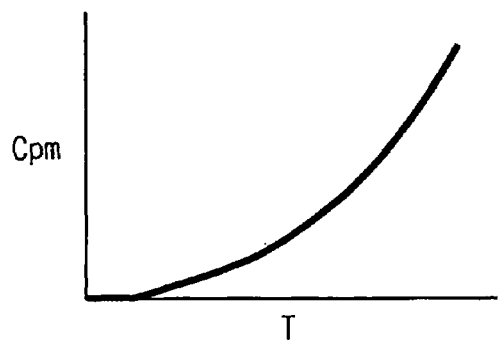
FIG. 4 is a graph showing a relationship between a combustion speed of exhaust particulate matters and temperature of exhaust gas passing through the particulate filter of the exhaust gas purification system according to the first embodiment.

In Step S203, combustion speeds Cpm of the deposited exhaust particulate matters in the respective spaces S1-S9 are calculated based on the temperatures A-I in the respective spaces S1-S9. The combustion speed Cpm is a quantity of the exhaust particulate matters combusted per unit time corresponding to a cycle, in which the processing of Steps S201 to S206 is performed. As shown in FIG. 4, the combustion speed Cpm increases as the temperature T increases in a range of the temperature T equal to or higher than a combustion start temperature corresponding to the activation temperature of the oxidation catalyst of the DPF 32.

In Step S204, PM deposition quantities mpm of the respective spaces S1-S9 are calculated based on PM deposition characteristic formulas. The PM deposition characteristic formulas for associating the PM deposition quantities mpm with the exhaust gas flow rates of the respective spaces S1-S9 and the DPF pressure loss ΔP are stored. Flow characteristics of the respective spaces S1-S9 are defined by the exhaust gas flow rates of the respective spaces S1-S9 and the DPF pressure loss ΔP. The flow characteristics and the PM deposition characteristic formulas of the respective spaces S1-S9 change because of the combustion of the exhaust particulate matters. Therefore, the PM deposition characteristic formulas are renewed in accordance with the combustion quantities (the quantities of the combusted exhaust particulate matters), first. Then, the PM deposition quantities mpm of the respective spaces S1-S9 are calculated based on the renewed PM deposition characteristic formulas. The exhaust gas flow rates, which are inputted to the PM deposition characteristic formulas to calculate the PM deposition quantities mpm of the respective spaces S1-S9, are calculated by dividing the exhaust gas flow rate, which is calculated based on the intake air quantity Ga, in accordance with the PM deposition quantities of the respective spaces S1-S9 less the combustion quantities.

In Step S205, a difference between a maximum PM deposition quantity mpm(max) and a minimum PM deposition quantity mpm(min) among the PM deposition quantities mpm of the spaces S1-S9 is calculated as a PM deposition quantity variation δMpm representing a deposition bias.

In Step S206, the PM deposition quantity variation δMpm is compared with a reference value α and it is determined whether the PM deposition quantity variation δMpm is "equal to or greater than" the reference value a. If the result of the determination in Step S206 is "YES", the compulsory regeneration is performed in Step S207 as in Steps S115 to S117 of the first embodiment. Thus, the deposited exhaust particulate matters are eliminated.

If the result of the determination in Step S206 is "NO", the ECU 51 returns to Step S201.

In Step S205, the PM deposition quantity variation δMpm is calculated from the difference between the maximum PM deposition quantity mpm(max) and the minimum PM deposition quantity mpm(min) of the spaces S1-S9. Alternatively, the combustion speeds Cpm (calculated in Step S203) may be accumulated for each space and a difference between the maximum value and the minimum value of the accumulated combustion speeds may be employed as the PM deposition quantity variation δMpm. A large quantity of the exhaust gas passes through a part of the DPF 32 where the permeation is easy. Therefore, even if a variation in the deposition quantity in the DPF 32 is caused by the combustion of the deposited exhaust particulate matters, self-regulation action for canceling the variation occurs. Depending on specifications, the deposited exhaust particulate matters may be eliminated by performing the compulsory regeneration if a difference between a maximum value and a minimum value among accumulated values of the combustion quantities in the spaces S1-S9 becomes equal to or greater than a predetermined reference value. It is because the PM deposition quantity variation δMpm is due to the combustion of the deposited exhaust particulate matters.

The temperature distribution in the DPF 32 may be calculated from the DPF outlet temperature TOUT based on an inverse transfer function, instead of calculating the temperature distribution from the DPF inlet temperature TIN based on the transfer function. Alternatively, the temperature distribution in the DPF 32 may be calculated from the DPF inlet temperature TIN and the DPF outlet temperature TOUT.

The combustion speed Cpm may be calculated based on other state quantities representing the operating states of the diesel engine, in addition to the temperatures in the DPF 32. For instance, the exhaust gas flow rate defines the supply of the oxygen and affects the combustion speed Cpm.

Third Embodiment

Figure 10:
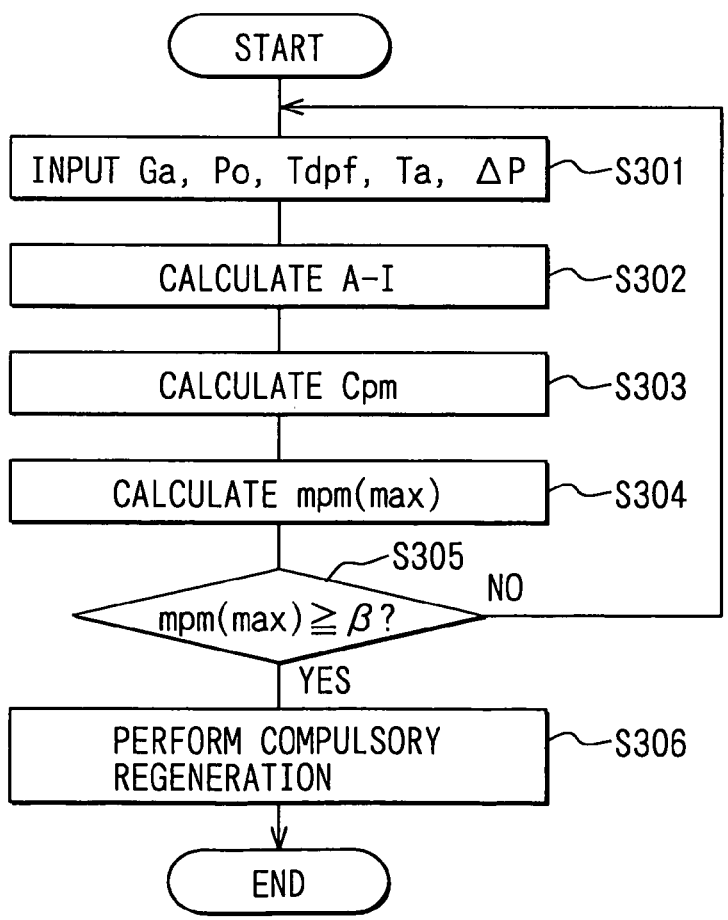
FIG. 10 is a flowchart showing control performed by an electronic control unit of an exhaust gas purification system of an internal combustion engine according to a third embodiment of the present invention.

Next, control steps performed by an ECU 51 of an exhaust gas purification system of an internal combustion engine according to a third embodiment of the present invention will be explained based on FIG. 10.

In Step S301, the intake air quantity Ga, the atmospheric pressure P0, the DPF temperature Tdpf, the ambient temperature Ta, and the DPF pressure loss ΔP are inputted as in Step S201 of the second embodiment. Then, in Step S302, the temperatures A-I in the respective spaces S1-S9 are calculated as in Step S202 of the second embodiment. Then, the combustion speeds Cpm in the respective spaces S1-S9 are calculated as in Step S203 of the second embodiment.

In Step S304, the PM deposition quantities mpm of the respective spaces S1-S9 of the DPF 32 are calculated and the maximum value among the PM deposition quantities mpm is selected as a maximum deposition portion PM deposition quantity mpm(max).

In Step S305, the maximum deposition portion PM deposition quantity mpm(max) is compared with a reference value β and it is determined whether the maximum deposition portion PM deposition quantity mpm(max) is "equal to or greater than" the reference value β. If the result of the determination in Step S305 is "YES", the compulsory regeneration is performed to eliminate the deposited exhaust particulate matters in Step S306 as in Step S207 of the second embodiment. If the result of the determination in Step S305 is "NO", the ECU 51 returns to Step S301.

If the deposition variation of the exhaust particulate matters is small and the maximum deposition portion PM deposition quantity mpm(max) does not reach the reference value β, the usual compulsory regeneration is performed when the PM deposition quantity Mpm reaches the regeneration start PM quantity Msta. The compulsory regeneration for eliminating the deposited exhaust particulate matters is performed after the usual compulsory regeneration is performed predetermined times.

In the present embodiment, it is determined whether the compulsory regeneration for eliminating the deposited exhaust particulate matters should be performed or not based on the maximum deposition portion PM deposition quantity mpm(max), where the possibility of the occurrence of the rapid combustion is the highest. Therefore, the elimination of the exhaust particulate matters is performed after the PM deposition quantity mpm in a certain space increases due to the deposition variation of the exhaust particulate matters. More specifically, the elimination of the exhaust particulate matters is not performed merely because the deposition variation is large. As a result, an increase in the frequency of the elimination of the exhaust particulate matters can be inhibited.

The present invention should not be limited to the disclosed embodiments, but may be implemented in many other ways without departing from the spirit of the invention.

What is claimed is:

1. An exhaust gas purification system of an internal combustion engine including a particulate filter in an exhaust passage of the engine for collecting exhaust particulate matters contained in exhaust gas, the exhaust gas purification system being provided so that regeneration of the particulate filter for combusting and reducing the exhaust particulate matters deposited on the particulate filter is performed by spontaneous regeneration, in which the deposited exhaust particulate matters are spontaneously combusted and reduced in the particulate filter by an increase of a temperature of the exhaust gas without control for increasing the exhaust gas temperature, and is performed by compulsory regeneration for compulsorily combusting and reducing the deposited exhaust particulate matters when a present deposition quantity of the deposited exhaust particulate matters, which is calculated based on operating states of the engine, exceeds a predetermined upper limit value, the exhaust gas purification system comprising:

determining circuitry for determining whether the spontaneous regeneration occurs or not based on the operating states of the engine;

controlling circuitry for completely performing the compulsory regeneration to eliminate the deposited exhaust particulate matters if the determining circuitry determines that the spontaneous regeneration stops after a start of the spontaneous regeneration and if the deposition quantity becomes equal to or less than a predetermined reset value; and temperature measuring circuitry for measuring the temperature in the particulate filter, wherein the determining circuitry determines that the spontaneous regeneration occurs if the sensed temperature exceeds a predetermined reference temperature.

2. An exhaust gas purification system of an internal combustion engine including a particulate filter in an exhaust passage of the engine for collecting exhaust particulate matters contained in exhaust gas, the exhaust gas purification system being provided so that regeneration of the particulate filter for combusting and reducing the exhaust particulate matters deposited on the particulate filter is performed by spontaneous regeneration, in which the deposited exhaust particulate matters are spontaneously combusted and reduced by an increase of a temperature of the exhaust gas, and is performed by compulsory regeneration for compulsorily combusting and reducing the deposited exhaust particulate matters when a present deposition quantity of the deposited exhaust particulate matters, which is calculated based on operating states of the engine, exceeds a predetermined upper limit value, the exhaust gas purification system comprising:

determining circuitry for determining whether the spontaneous regeneration occurs or not based on the operating states of the engine; and controlling circuitry for completing the compulsory regeneration to eliminate the deposited exhaust particulate matters if the determining circuitry determines that the spontaneous regeneration stops after a start of the spontaneous regeneration and if the deposition quantity becomes equal to or less than a predetermined reset value;

wherein the controlling circuitry sets the predetermined reset value at a lower limit value of the deposition quantity of the exhaust particulate matters corresponding to a permissible limit value of a deposition variation of the exhaust particulate matters in the particulate filter, the deposition variation increasing as the regeneration progresses.

3. An exhaust gas purification system of an internal combustion engine including a particulate filter in an exhaust passage of the engine for collecting exhaust particulate matters contained in exhaust gas, the exhaust gas purification system being provided so that regeneration of the particulate filter for combusting and reducing the exhaust particulate matters deposited on the particulate filter is performed by spontaneous regeneration, in which the deposited exhaust particulate matters are spontaneously combusted and reduced in the particulate filter by an increase of a temperature of the exhaust gas without control for increasing the exhaust gas temperature, and is performed by compulsory regeneration for compulsorily combusting and reducing the deposited exhaust particulate matters when a present deposition quantity of the deposited exhaust particulate matters, which is calculated based on operating states of the engine, exceeds a predetermined upper limit value, the exhaust gas purification system comprising:

distribution measuring circuitry for measuring a combustion distribution of the deposited exhaust particulate matters in the particulate filter;

bias calculating circuitry for calculating a deposition bias indicating a deposition variation of the exhaust particulate matters in the particulate filter based on the combustion distribution in the particulate filter; and controlling circuitry for completely performing the compulsory regeneration to eliminate the deposited exhaust particulate matters if the deposition bias exceeds a predetermined reference value.

4. The exhaust gas purification system as in claim 3, wherein the bias calculating circuitry calculates deposition quantities of the exhaust particulate matters deposited in multiple portions of the particulate filter and calculates a difference between a maximum value and a minimum value of the deposition quantities as the deposition bias.

5. An exhaust gas purification system of an internal combustion engine including a particulate filter in an exhaust passage of the engine for collecting exhaust particulate matters contained in exhaust gas, the exhaust gas purification system being provided so that regeneration of the particulate filter for combusting and reducing the exhaust particulate matters deposited on the particulate filter is performed by spontaneous regeneration, in which the deposited exhaust particulate matters are spontaneously combusted and reduced by an increase of a temperature of the exhaust gas, and is performed by compulsory regeneration for compulsorily combusting and reducing the deposited exhaust particulate matters when a present deposition quantity of the deposited exhaust particulate matters, which is calculated based on operating states of the engine, exceeds a predetermined upper limit value, the exhaust gas purification system comprising:

distribution measuring circuitry for measuring a combustion distribution of the deposited exhaust particulate matters in the particulate filter;

bias calculating circuitry for calculating a deposition bias indicating a deposition variation of the exhaust particulate matters in the particulate filter based on the combustion distribution in the particulate filter; and controlling circuitry for completing the compulsory regeneration to eliminate the deposited exhaust particulate matters if the deposition bias exceeds a predetermined reference value;

wherein the bias calculating circuitry accumulates combustion speeds of the exhaust particulate matters in multiple portions of the particulate filter and calculates a difference between a maximum value and a minimum value of the accumulated combustion speeds as the deposition bias.

6. An exhaust gas purification system of an internal combustion engine including a particulate filter in an exhaust passage of the engine for collecting exhaust particulate matters contained in exhaust gas, the exhaust gas purification system being provided so that regeneration of the particulate filter for combusting and reducing the exhaust particulate matters deposited on the particulate filter is performed by spontaneous regeneration, in which the deposited exhaust particulate matters are spontaneously combusted and reduced by an increase of a temperature of the exhaust gas, and is performed by compulsory regeneration for compulsorily combusting and reducing the deposited exhaust particulate matters when a present deposition quantity of the deposited exhaust particulate matters, which is calculated based on operating states of the engine, exceeds a predetermined upper limit value, the exhaust gas purification system comprising:

distribution measuring circuitry for measuring a combustion distribution of the deposited exhaust particulate matters in the particulate filter;

bias calculating circuitry for calculating a deposition bias indicating a deposition variation of the exhaust particulate matters in the particulate filter based on the combustion distribution in the particulate filter; and controlling circuitry for completing the compulsory regeneration to eliminate the deposited exhaust particulate matters if the deposition bias exceeds a predetermined reference value;

wherein the bias calculating circuitry accumulates combustion quantities of the exhaust particulate matters in multiple portions of the particulate filter and calculates a difference between a maximum value and a minimum value of the accumulated combustion quantities of the exhaust particulate matters as the deposition bias.

7. An exhaust gas purification system of an internal combustion engine including a particulate filter in an exhaust passage of the engine for collecting exhaust particulate matters contained in exhaust gas, the exhaust gas purification system being provided so that regeneration of the particulate filter for combusting and reducing the exhaust particulate matters deposited on the particulate filter is performed by spontaneous regeneration, in which the deposited exhaust particulate matters are spontaneously combusted and reduced by an increase of a temperature of the exhaust gas, and is performed by compulsory regeneration for compulsorily combusting and reducing the deposited exhaust particulate matters when a present deposition quantity of the deposited exhaust particulate matters, which is calculated based on operating states of the engine, exceeds a predetermined upper limit value, the exhaust gas purification system comprising:

distribution measuring circuitry for measuring a combustion distribution of the deposited exhaust particulate matters in the particulate filter;

bias calculating circuitry for calculating a deposition bias indicating a deposition variation of the exhaust particulate matters in the particulate filter based on the combustion distribution in the particulate filter; and controlling circuitry for completing the compulsory regeneration to eliminate the deposited exhaust particulate matters if the deposition bias exceeds a predetermined reference value;

temperature measuring circuitry for measuring the temperature in the particulate filter, wherein the distribution measuring circuitry calculates a combustion speed of the deposited exhaust particulate matters based on a correspondence between the temperature and the combustion speed.

8. An exhaust gas purification system of an internal combustion engine including a particulate filter in an exhaust passage of the engine for collecting exhaust particulate matters contained in exhaust gas, the exhaust gas purification system being provided so that regeneration of the particulate filter for combusting and reducing the exhaust particulate matters deposited on the particulate filter is performed by spontaneous regeneration, in which the deposited exhaust particulate matters are spontaneously combusted and reduced in the particulate filter by an increase of a temperature of the exhaust gas without control for increasing the exhaust gas temperature, and is performed by compulsory regeneration for compulsorily combusting and reducing the deposited exhaust particulate matters when a present deposition quantity of the deposited exhaust particulate matters, which is calculated based on operating states of the engine, exceeds a predetermined upper limit value, the exhaust gas purification system comprising:

distribution measuring circuitry for measuring a combustion distribution of the deposited exhaust particulate matters in the particulate filter;

quantity calculating circuitry for calculating a deposition quantity of the exhaust particulate matters at a maximum deposition portion in the particulate filter, where the deposition quantity is maximized in the particulate filter, based on the operating states of the engine including the combustion distribution in the particulate filter; and controlling circuitry for completely performing the compulsory regeneration to eliminate the deposited exhaust particulate matters if the deposition quantity at the maximum deposition portion exceeds a predetermined reference value.

9. An exhaust gas purification system of an internal combustion engine including a particulate filter in an exhaust passage of the engine for collecting exhaust particulate matters contained in exhaust gas, the exhaust gas purification system being provided so that regeneration of the particulate filter for combusting and reducing the exhaust particulate matters deposited on the particulate filter is performed by spontaneous regeneration, in which the deposited exhaust particulate matters are spontaneously combusted and reduced by an increase of a temperature of the exhaust gas, and is performed by compulsory regeneration for compulsorily combusting and reducing the deposited exhaust particulate matters when a present deposition quantity of the deposited exhaust particulate matters, which is calculated based on operating states of the engine, exceeds a predetermined upper limit value, the exhaust gas purification system comprising:

distribution measuring circuitry for measuring a combustion distribution of the deposited exhaust particulate matters in the particulate filter;

quantity calculating circuitry for calculating a deposition quantity of the exhaust particulate matters at a maximum deposition portion in the particulate filter, where the deposition quantity is maximized in the particulate filter, based on the operating states of the engine including the combustion distribution in the particulate filter; and controlling circuitry for completing the compulsory regeneration to eliminate the deposited exhaust particulate matters if the deposition quantity at the maximum deposition portion exceeds a predetermined reference value;

temperature measuring circuitry for measuring the temperature in the particulate filter, wherein the distribution measuring circuitry calculates a combustion speed of the exhaust particulate matters based on a correspondence between the temperature and the combustion speed.

* * * * *